US008650281B1

(12) United States Patent
Toley et al.

(10) Patent No.: US 8,650,281 B1
(45) Date of Patent: Feb. 11, 2014

(54) INTELLIGENT ARBITRATION SERVERS FOR NETWORK PARTITION ARBITRATION

(75) Inventors: Abhijit Toley, Pune (IN); Viraj Kamat, Pune (IN)

(73) Assignee: Symantec Corporation, Mountain View, CA (US)

( * ) Notice: Subject to any disclaimer, the term of this patent is extended or adjusted under 35 U.S.C. 154(b) by 203 days.

(21) Appl. No.: 13/363,529

(22) Filed: Feb. 1, 2012

(51) Int. Cl.
*G06F 15/173* (2006.01)
*G06F 15/16* (2006.01)
*G06F 11/00* (2006.01)
*G06F 13/00* (2006.01)
*G06F 13/28* (2006.01)
*H04L 1/00* (2006.01)
*H04L 12/26* (2006.01)
*H04L 12/24* (2006.01)
*H04L 29/08* (2006.01)
*H04L 29/06* (2006.01)
*H04L 29/14* (2006.01)
*H04L 12/56* (2011.01)
*G06F 13/18* (2006.01)
*G06F 12/08* (2006.01)

(52) U.S. Cl.
CPC ....... *H04L 41/0213* (2013.01); *H04L 29/08144* (2013.01); *H04L 29/06* (2013.01); *H04L 29/14* (2013.01); *H04L 47/10* (2013.01); *G06F 13/18* (2013.01); *G06F 12/08* (2013.01)
USPC ............ 709/223; 709/226; 709/209; 714/4.1; 714/10; 711/151; 711/159; 370/235; 370/252

(58) Field of Classification Search
USPC .......................... 709/209, 223, 226; 714/4.1; 711/151–159; 370/216–253
See application file for complete search history.

(56) References Cited

U.S. PATENT DOCUMENTS

| 6,279,032 | B1 | 8/2001 | Short et al. |
| 6,615,256 | B1 * | 9/2003 | van Ingen et al. ............ 709/220 |
| 6,662,219 | B1 * | 12/2003 | Nishanov et al. ............ 709/220 |
| 7,086,086 | B2 | 8/2006 | Ellis |
| 7,623,460 | B2 | 11/2009 | Miyazaki |
| 7,792,050 | B2 | 9/2010 | Metke et al. |
| 8,024,432 | B1 | 9/2011 | Sharma et al. |
| 8,060,773 | B1 | 11/2011 | Katkar et al. |
| 8,108,715 | B1 * | 1/2012 | Agarwal ......................... 714/10 |
| 8,332,501 | B2 | 12/2012 | Sharma et al. |
| 8,370,474 | B1 | 2/2013 | Reeves |
| 2003/0065782 | A1 * | 4/2003 | Nishanov et al. ............ 709/226 |
| 2006/0036896 | A1 * | 2/2006 | Gamache et al. ................. 714/4 |
| 2007/0186059 | A1 * | 8/2007 | Miki .............................. 711/151 |
| 2008/0184061 | A1 * | 7/2008 | Tripathi et al. .................... 714/4 |

(Continued)

*Primary Examiner* — Wing F Chan
*Assistant Examiner* — Raji Krishnan
(74) *Attorney, Agent, or Firm* — Meyertons Hood Kivlin Kowert & Goetzel, PC

(57) ABSTRACT

Various embodiments of a system and method for handling network partitions in a cluster of nodes are disclosed. The system and method may use a set of arbitration servers that are ordered in a particular order. Client nodes in different partitions may send requests to the arbitration servers to attempt to win control of them. The client node that wins a majority of the arbitration servers may remain in the cluster, and the client nodes in the other partitions may exit the cluster. The first arbitration server may award control to whichever client node whose request for control is received first. The remaining arbitration servers may be configured to give preference to the winner of one or more of the previous arbitration servers to attempt to ensure that one of the client nodes wins a majority.

18 Claims, 9 Drawing Sheets

(56) References Cited

U.S. PATENT DOCUMENTS

| | | | |
|---|---|---|---|
| 2010/0030981 A1* | 2/2010 | Cook | 711/159 |
| 2010/0250750 A1* | 9/2010 | Massa et al. | 709/226 |
| 2011/0202795 A1* | 8/2011 | Marathe et al. | 714/23 |
| 2012/0239814 A1* | 9/2012 | Mueller et al. | 709/226 |

* cited by examiner

INTELLIGENT ARBITRATION SERVERS FOR NETWORK PARTITION ARBITRATION

BACKGROUND OF THE INVENTION

1. Field of the Invention

This invention relates to the field of computer networks, and more particularly, to a system and method for handling network partition situations.

2. Description of the Related Art

Nodes in a computer cluster often work together to share data or storage devices. The nodes may need to keep in communication with each other through a network to coordinate access to the shared data, e.g., to ensure that multiple nodes do not attempt to write to the same data location at the same time, which could cause the data to become corrupted. Problems can arise when the network becomes partitioned such that some of the nodes in the cluster cannot communicate with other nodes in the cluster because then the nodes may not be able to communicate to coordinate access to the shared data.

To handle network partition situations, the system needs to perform an arbitration process to decide which nodes should remain in the cluster and which nodes should leave the cluster. One conventional arbitration technique is to use a set of SCSI disk drives as coordination points. Two nodes in different partitions may race to win control of a majority of the coordination point disk drives. Whichever node wins the majority is allowed to remain in the cluster, and the other node exits the cluster.

SUMMARY

Various embodiments of a computer-accessible storage medium, system, and method for handling network partition situations are disclosed. According to one embodiment of the method, a request for control of a particular arbitration server may be received from a first node. The particular arbitration server may be one of a set of arbitration servers for arbitrating network partition events. The set of arbitration servers may be ordered according to an order. The method may include determining whether the first node won control of a previous arbitration server of the set of arbitration servers. The previous arbitration server may come before the particular arbitration server in the order. If the first node did not win control of the previous arbitration server, the method may operate to wait for a request for control of the particular arbitration server from a second node that did win control of the previous arbitration server, and to determine whether the request from the second node is received before a wait time expires. If the request from the second node is received before the wait time expires, the method may operate to send a response to the second node indicating that it has won the particular arbitration server and a response to the first node indicating that it has lost the particular arbitration server. If the request from the second node is not received before the wait time expires, the method may operate to send a response to the first node indicating that it has won the particular arbitration server.

In some embodiments, if the first node won control of the previous arbitration server, the method may operate to send a response to the first node indicating that it has won the particular arbitration server without waiting for a request for control of the particular arbitration server from the second node.

In some embodiments, if the request from the second node is received after the wait time expires, the method may further operate to send a response to the second node indicating that it has lost the particular arbitration server.

In some embodiments, the request from the first node may include information indicating whether the first node won control of the previous arbitration server, and the method may operate to analyze the request from the first node to determine whether the first node won control of the previous arbitration server.

In some embodiments the method may further operate to, prior to receiving the request for control of the particular arbitration server from the first node, receive a request for control of the previous arbitration server from the first node and a request for control of the previous arbitration server from the second node. If the request for control of the previous arbitration server from the first node was received before the request for control of the previous arbitration server from the second node, the method may further operate to send a response to the first node indicating that it has won the previous arbitration server and a response to the second node indicating that it has lost the previous arbitration server. If the request for control of the previous arbitration server from the first node was received after the request for control of the previous arbitration server from the second node, the method may further operate to send a response to the first node indicating that it has lost the previous arbitration server and a response to the second node indicating that it has won the previous arbitration server.

In some embodiments the method may operate to cause the first node and the second node to request control of the previous arbitration server and the particular arbitration server in response to determining that the first node has become partitioned from the second node in a network.

In some embodiments the first node and the second node may be nodes of a network cluster. The method may further operate to cause the second node to remain in the network cluster in response to determining that the second node has won a majority of the arbitration servers in the set of arbitration servers, and to cause the first node to exit the network cluster in response to determining that the first node has lost a majority of the arbitration servers in the set of arbitration servers.

In some embodiments the first node and the second node may be configured to use a storage device. The method may further operate to cause the second node to continue using the storage device in response to determining that the second node has won a majority of the arbitration servers in the set of arbitration servers, and to cause the first node to discontinue using the storage device in response to determining that the first node has lost a majority of the arbitration servers in the set of arbitration servers.

In some embodiments the method may further operate to cause the first node to send a request for control of the previous arbitration server to the previous arbitration server, to receive a response from the previous arbitration server indicating that the first node did not win control of the previous arbitration server, and to send the request for control of the particular arbitration server to the particular arbitration server without a delay intended to delay the particular arbitration server from receiving the request.

In some embodiments, in sending the request for control of the particular arbitration server to the particular arbitration server, the method may further operate to include information in the request indicating that the first node did not win control of the previous arbitration server.

The computer-accessible storage medium may store program instructions executable by one or more processors to receive from a first node a request for control of a particular arbitration server. The particular arbitration server may be one of a set of arbitration servers for arbitrating network partition events. The set of arbitration servers may be ordered according to an order. The program instructions may be further executable by the one or more processors to determine whether the first node won control of a previous arbitration server of the set of arbitration servers. The previous arbitration server may be an arbitration server that comes before the particular arbitration server in the order. If the first node did not win control of the previous arbitration server, the program instructions may be further executable by the one or more processors to wait for a request for control of the particular arbitration server from a second node that won control of the previous arbitration server, and to determine whether the request from the second node is received before a wait time expires. If the request from the second node is received before the wait time expires, the program instructions may be further executable by the one or more processors to send a response to the second node indicating that it has won the particular arbitration server and a response to the first node indicating that it has lost the particular arbitration server. If the request from the second node is not received before the wait time expires, the program instructions may be further executable by the one or more processors to send a response to the first node indicating that it has won the particular arbitration server. In further embodiments the program instructions may be further executable by the one or more processors to perform additional aspects of the method outlined above.

The system may comprise a first node, a second node, and a set of arbitration server computers for arbitrating network partition events. The set of arbitration server computers may be ordered according to an order, and may include a first arbitration server computer and a second arbitration server computer. The first arbitration server computer may come before the second arbitration server computer in the order. The second arbitration server computer may be configured to receive from the first node a request for control of the second arbitration server computer, and to determine whether the first node previously won control of the first arbitration server computer. If the first node did not win control of the first arbitration server computer, the second arbitration server computer may be configured to wait for a request for control of the second arbitration server computer from the second node. The second node may have previously won control of the first arbitration server computer. The second arbitration server computer may be further configured to determine whether the request from the second node is received before a wait time expires. If the request from the second node is received before the wait time expires, the second arbitration server computer may be configured to send a response to the second node indicating that it has won the second arbitration server computer and a response to the first node indicating that it has lost the second arbitration server computer. If the request from the second node is not received before the wait time expires, the second arbitration server computer may be configured to send a response to the first node indicating that it has won the second arbitration server computer. In further embodiments the system may be further configured to implement additional aspects of the method outlined above.

Figure 1:
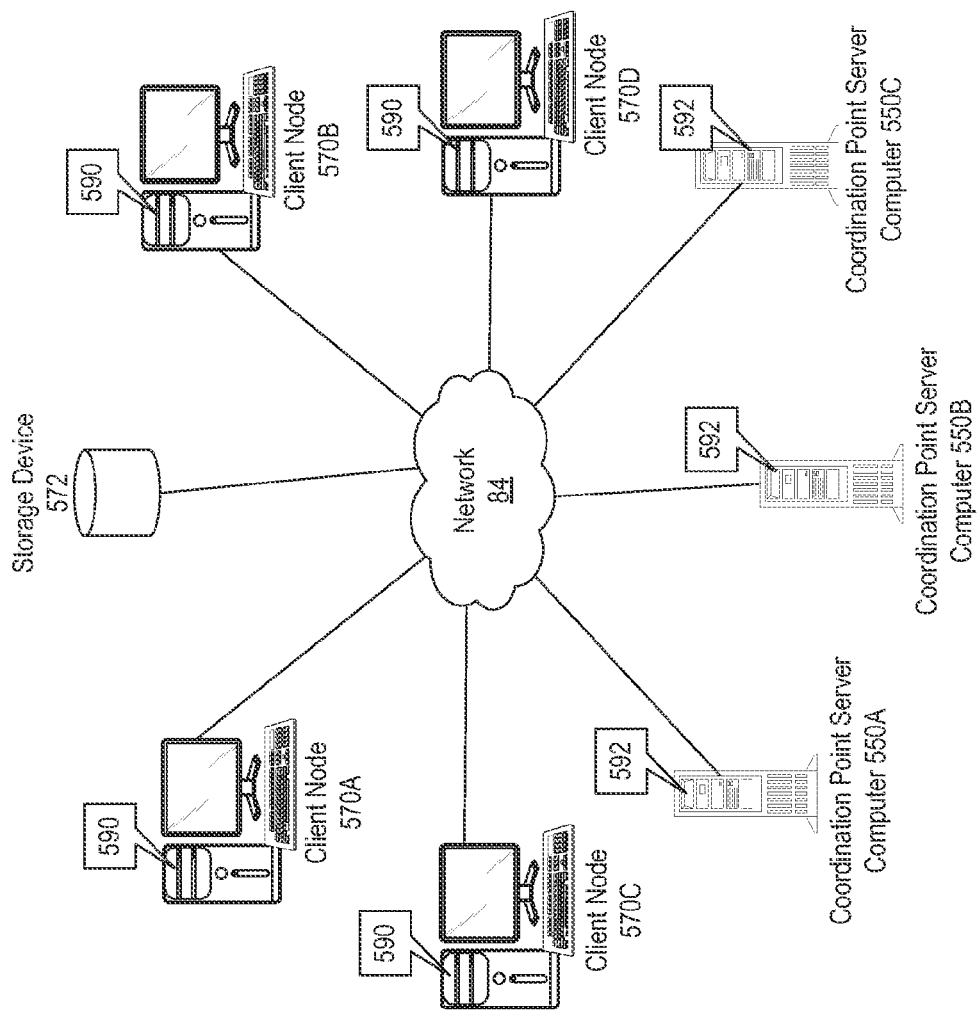
FIG. 1 illustrates an example of a system including a plurality of client nodes, a storage device shared by the client nodes, and a plurality of coordination point server computers.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates an example of a system including a cluster of client nodes 570. Each client node may be a computer system that executes software to perform a particular application. In some embodiments the application may involve writing data to the storage device 572, which may be shared by multiple ones of the client nodes 570.

The client nodes 570 may be coupled to each other and to the storage device 572 through a network 84. The network 84 may include any type of network or combination of networks. For example, the network may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. Also, computer may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

During normal operation, the network 84 may enable the client nodes 570 to maintain communication links with each other, which may allow the client nodes 570 to communicate with each other to coordinate access to the shared storage device 572. For example, the client nodes 570 may need to communicate to coordinate access to the shared storage device 572 so that multiple client nodes do not attempt to write to same portion of data on the storage device 572 at the same time or perform other kinds of write operations that could cause the data on the storage device 572 to become corrupted or in an inconsistent state.

However, the network 84 may sometimes become temporarily partitioned into two or more partitions, e.g., due to a failure of one or more links in the network 84. Each partition may include one or more of the client nodes 570. Nodes in a given partition may be able to communicate with each other (if there is more than one node in the partition), but may not be able to communicate with nodes in other partitions.

As illustrated in FIG. 1, the system also includes a plurality of coordination point server computers 550 coupled to the network 84. When the client nodes 570 become partitioned from each other, they may communicate with the coordination point server computers 550 to perform an arbitration process to decide which node(s) can remain in the cluster, and which node(s) should exit from the cluster. The arbitration process may be implemented by client-side arbitration software 590 that executes on the client nodes 570 and respective coordination point software servers 592 that execute on the coordination point server computers 550. The client-side arbitration software 590 on different client nodes 570 may compete to win control of a majority of the coordination point servers 592. In some embodiments, if there are multiple nodes in a given partition then one of the nodes in the partition may be selected as a representative node that competes on behalf of all the nodes in that partition. Thus, for example, if there are two network partitions then only two of the client nodes 570 (one node from each of the partitions) may compete to win control of the coordination point servers 592, although there may be more than two client nodes 570 in the cluster. Whichever node wins control of a majority of the coordination point servers 592, as well as the other nodes (if any) in its partition, may remain in the cluster. The other node(s) in the other partition(s) may exit from the cluster, and may then reboot themselves or perform other actions to resolve the partition so that they can re-join the cluster.

Since the coordination point servers 592 are used for arbitrating network partition events, the coordination point servers 592 are also referred to herein as arbitration servers, and the computers 550 on which the coordination point servers 592 execute are also referred to herein as an arbitration server computers.

The coordination point servers 592 (arbitration servers) may be ordered according to a particular order such that one of the coordination point servers 592 is first in the order, one of the coordination point servers 592 is second in the order, etc. For each respective client node 570 that competes for control of the coordination point servers 592, the client-side arbitration software 590 on the respective client node 570 may send requests for control of the coordination point servers 592 to the coordination point servers 592 according to their order. For example, the client-side arbitration software 590 on a given node may first send a request for control of the first coordination point server 592 to the first coordination point server 592, and may then send a request for control of the second coordination point server 592 to the second coordination point server 592, and so on.

The first coordination point server 592 may grant control of itself to whichever client node 570 whose request message is received first. The rest of the coordination point servers 592 may use more complicated logic in deciding which client node 570 should win control of the respective coordination point server 592. More particularly, instead of simply granting control to whichever client node 570 whose request message is received first, the rest of the coordination point servers 592 may give preference to a particular client node that won control of one or more of the previous coordination point servers 592. For example, suppose that two client nodes 570, node A and node B, compete for control of the coordination point servers 592. If node B loses in the race for the first coordination point server 592 then node B may convey this information to the second coordination point server 592 in its request for control of the second coordination point server 592. The second coordination point server 592 may then give preference to the other node. If the request from node B arrives at the second coordination point server before the request from node A, the second coordination point server may wait a reasonable amount of time (e.g., a configurable wait time) to receive the request from node A, e.g., in order to accommodate possible delay due to network latency. If the request from node A is received within this wait time period then the second coordination point server will award control to node A. In most cases the request from node A will arrive either before the request from node B or within the time period, thus ensuring that the same node (node A) wins control of the multiple coordination points.

If the request from node A does not arrive at the second coordination point server within the wait time period then the second coordination point server may award control of itself to node B. In this case, the nodes may then compete for control of the third coordination point server. In some embodiments the third coordination point server may give both of the nodes equal preference since both of them have won control of one of the coordination point servers. In other embodiments the third coordination point server may give preference to one of the nodes over the other, e.g., the node that won control of the first coordination point server or the second coordination point server.

As noted above, an arbitration technique used in some conventional systems is to use a set of SCSI disks as coordination points. If a node loses the race to win control of the first coordination point disk drive then the node may intentionally delay sending its request for control to the second coordination point disk drive. This may help to ensure that the same node that won control of the first coordination point disk drive will also win control of the second coordination point disk drive. However, it also requires the losing node to always delay sending its request for control to the second coordination point disk drive. Although the delay time may be relatively small, the delay may still adversely impact the delaying node since it may not be operational in the cluster while the partition arbitration process is being performed. The purpose of the delay is to ensure that the delaying node loses the arbitration (i.e., to ensure that the other node wins a majority of the coordination point disk drives), but the delay may increase the amount of time required for the delaying node to learn that it has indeed lost the arbitration. Since the node may not exit the cluster until it knows that it has lost the arbitration, the delay may increase the amount of time that it takes to exit the cluster and then re-boot and attempt to re-join the cluster. Thus, the overall effect is that the intentional delay may increase the downtime of the node, e.g., increase the amount of time that elapses between the time the node first ceases operating in the cluster because it discovers that it has become partitioned from other nodes in the cluster and the time when the node once again becomes operational in the cluster.

In contrast, in the arbitration process disclosed in the present application, when a node B loses in its request for control of the first coordination point, the node B may immediately send a request for control to the second coordination point without an intentional delay. The request sent to the second coordination point may inform the second coordination point that the node B lost its bid for control of the first coordination point. In some cases, by the time the request from the node B arrives at the second coordination point, the second coordination point may have already received the request for control from the other node A that won the first coordination point. In this case, the second coordination point may immediately respond to the node B to inform it that it has lost the second coordination point as well. Thus, since there was no intentional delay by the node B in sending the request to the second coordination point, the node B may more quickly learn that it has lost a majority of the coordination points, and may thus more quickly exit from the cluster. In other cases, the request from the node B may arrive at the second coordination point first, but the request from the node A may arrive very soon thereafter. In this case, the second coordination point may wait to respond to the node B until after the request from the node A has arrived, but the time increase due to the wait time may often still be shorter than the amount of intentional delay time that would be required according to the conventional arbitration process. Thus, the arbitration process disclosed in the present application may reduce the amount of time taken for a node to learn that it has lost the arbitration, which may enable the node to exit from the cluster more quickly and begin to re-boot or take other actions to attempt to re-join the cluster. This time reduction may be advantageous in systems that need high availability of the cluster nodes.

Also, the use of software servers for the coordination points (instead of disk drives as in a conventional arbitration process) may enable the coordination points to implement more complex logic to decide which node should win control of each coordination point, e.g., rather than simply awarding control of each coordination point to the node whose request arrives first. The use of software servers for the coordination points may also have other advantages. For example, in various embodiments the coordination point server computers 550 that execute the coordination point servers 592 may have any geographical locations with respect to the client nodes 570, as long as they are reachable through the network 84. In contrast, in conventional arbitration techniques, the coordination point disk drives are typically located in close proximity to the client nodes 570. In some embodiments the coordination point server computers 550 may be configured to act as coordination points for multiple clusters of nodes. Thus, when a new cluster is created, an existing set of coordination point server computers 550 that are already operational for other clusters may be used for the new cluster, which may reduce the work required to configure the new cluster.

Referring again to FIG. 1, in the illustrated example there are three coordination point server computers 550. In various embodiments there are may be other numbers of coordination point server computers 550. Having more than one coordination point server computer 550 may help to ensure that there is not a single point of failure, e.g., in case the coordination point server computer goes down or is unreachable from any of the client nodes 570 in the cluster. Having an odd number of coordination point server computers 550 may increase the likelihood that one of the nodes will win a majority of the coordination points. In the illustrated example, there are also four client nodes 570. In other embodiments there may be any number of (at least two) client nodes 570. Also, the client nodes 570 may share any number of storage devices 572, or in some embodiments may not share any storage devices 572. In various embodiments the storage device(s) 572 may be any kind of storage device, such as a disk drive, tape drive, optical drive, etc.

Figure 2:
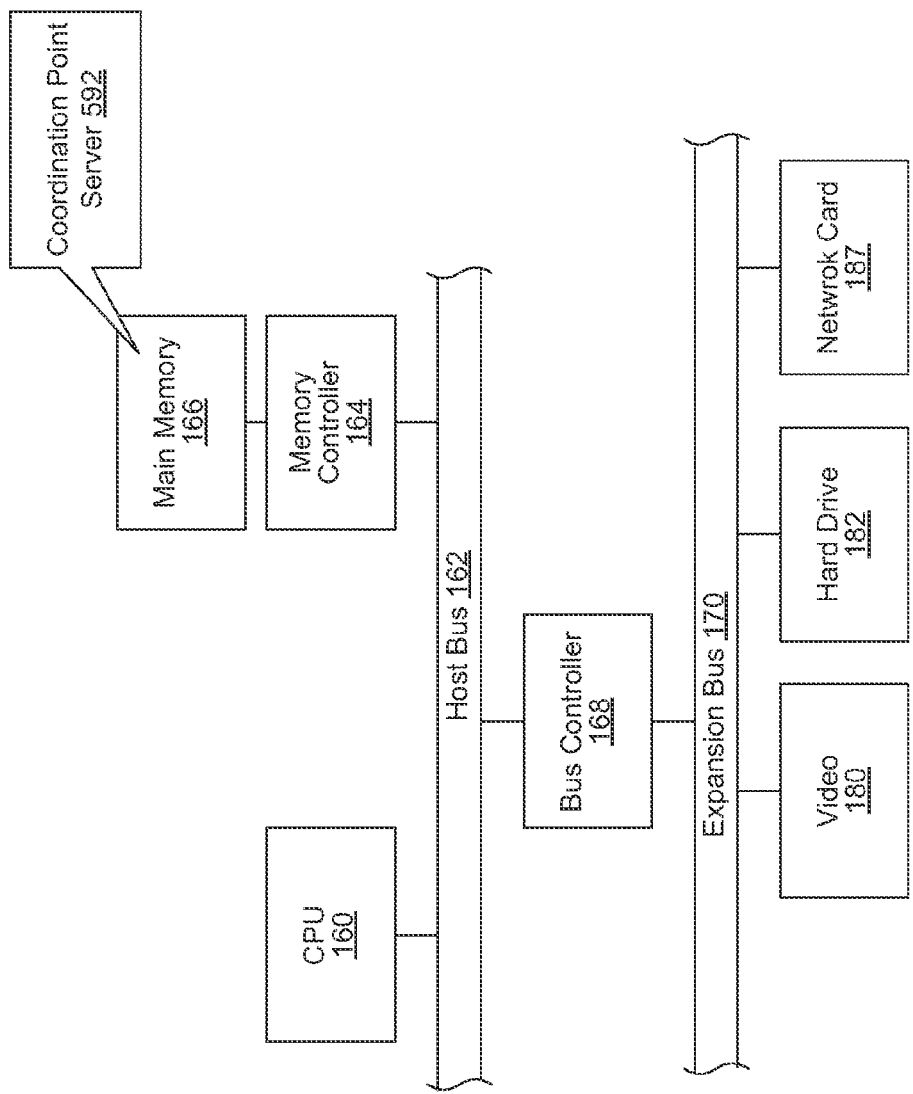
FIG. 2 illustrates one embodiment of a coordination point server computer in more detail.

In various embodiments each coordination point server 592 may execute on any kind of coordination point server computer system 550, such as a personal computer system (PC), workstation, network appliance, distributed computer system, handheld device, or other computing device or combinations of devices. In general, the term "computer system" can be broadly defined to encompass any device (or combination of devices) having at least one processor that executes instructions from one or more storage mediums. FIG. 2 illustrates one embodiment of a coordination point server computer 550 in more detail. The coordination point server computer 550 may have any configuration or architecture, and FIG. 2 illustrates a representative PC embodiment. Elements of a computer not necessary to understand the present description have been omitted for simplicity.

The coordination point server computer 550 may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the coordination point server computer 550 may include multiple processors 160.

The coordination point server computer 550 may also include memory 166 in which program instructions implementing the coordination point server 592 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the coordination point server computer 550. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, as well as one or more hard disk drives 182 or other storage device which stores information in a non-volatile manner. The coordination point server computer 550 may also include a network card or device 187 that enables the coordination point server computer 550 to send and receive information over the network 84.

Figure 3:
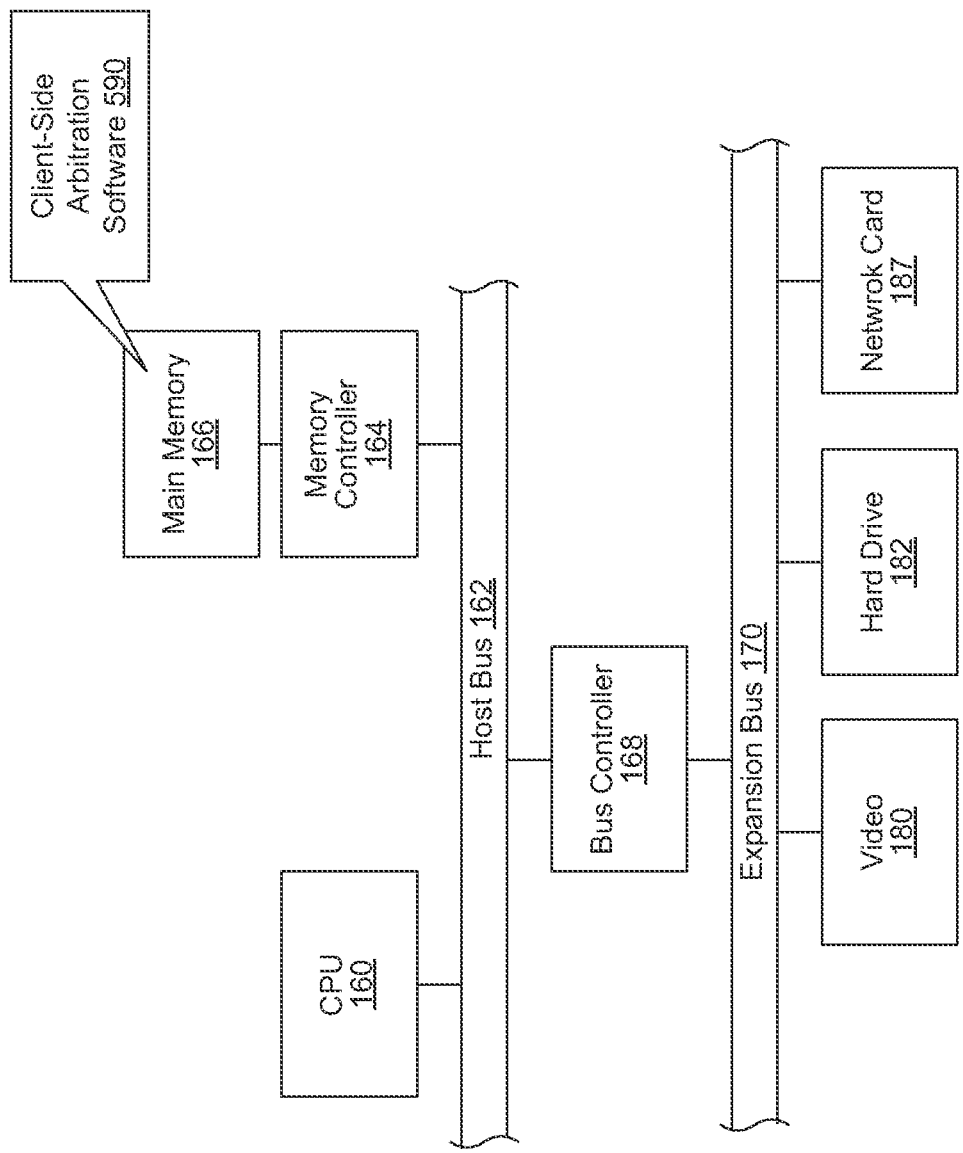
FIG. 3 illustrates one embodiment of a client node in more detail.

Each client node 570 may also be any kind of computer system, such as a personal computer system (PC), workstation, network appliance, distributed computer system, handheld device, or other computing device or combinations of devices. FIG. 3 illustrates one embodiment of a client node 570 in more detail.

The client node 570 may include at least one central processing unit or CPU (processor) 160 which is coupled to a processor or host bus 162. The CPU 160 may be any of various types. In some embodiments the client node 570 may include multiple processors 160. The client node 570 may include memory 166 in which program instructions implementing the client-side arbitration software 590 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the client node 570.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, as well as one or more hard disk drives 182 or other storage device which stores information in a non-volatile manner. The client node 570 may also include a network card or device 187 that enables the client node 570 to send and receive information over the network 84.

Figure 4:
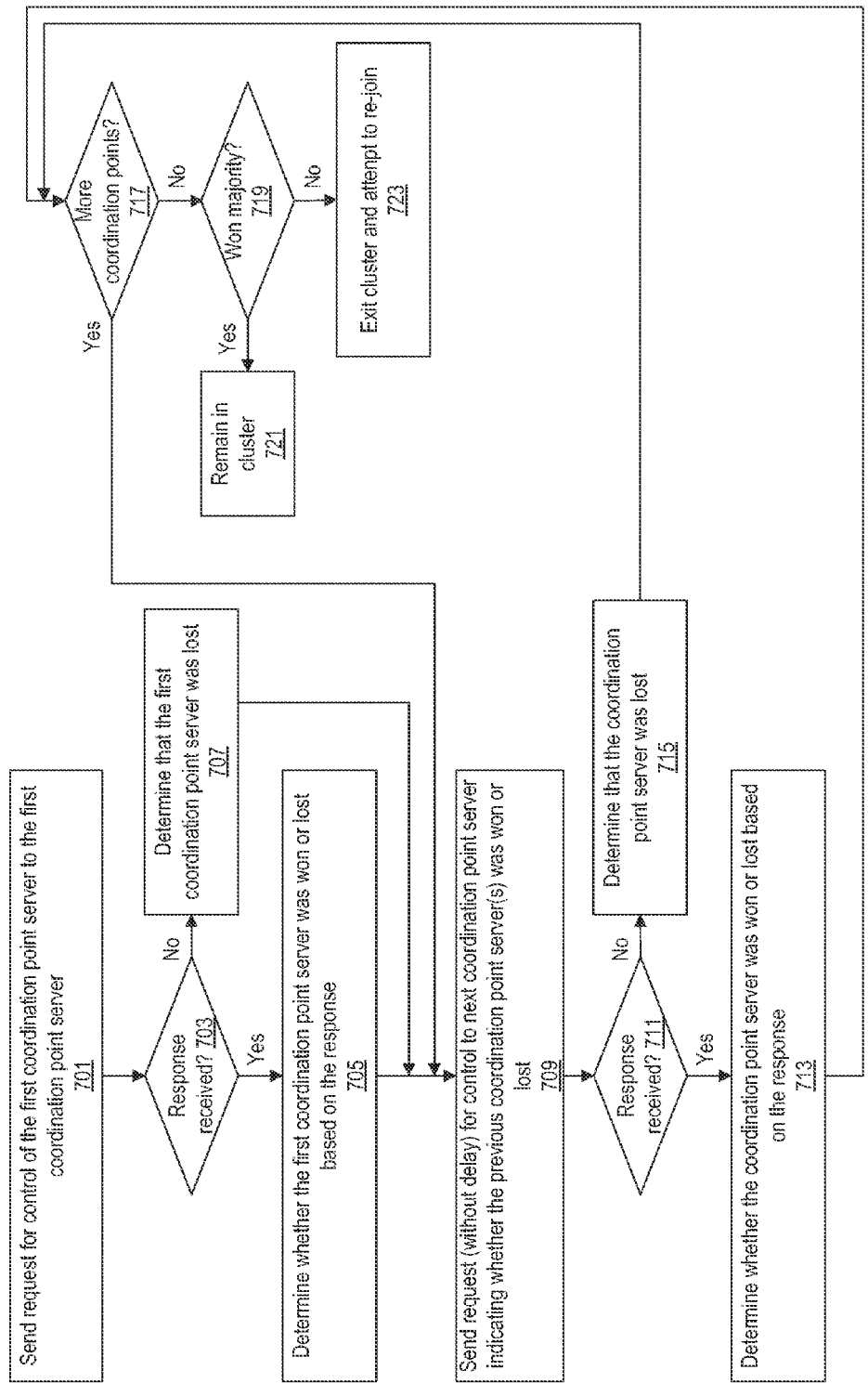
FIG. 4 is a flowchart diagram illustrating one embodiment of the operation of client-side arbitration software executing on a given client node.

FIG. 4 is a flowchart diagram illustrating one embodiment of the operation of the client-side arbitration software 590 executing on a given client node 570 during the network partition arbitration method described herein. Each client node 570 that participates in the network partition arbitration may execute respective client-side arbitration software 590 to perform the illustrated operations.

As indicated in block 701, the client-side arbitration software 590 may send a request for control of the first coordination point server 592 to the first coordination point server 592. The coordination point servers 592 may be ordered in a particular order, and the client-side arbitration software 590 on each client node 570 that participates in the network partition arbitration may be configured to send requests to the coordination point servers 592 in the same order.

In block 703, the client-side arbitration software 590 may determine whether a response to the request was received from the first coordination point server 592. For example, the client-side arbitration software 590 may determine whether a response is received within a certain timeout period. It is possible that the client-side arbitration software 590 cannot communicate with the first coordination point server 592 due to problems in the network 84, in which case no response is received, or the response may be lost. If no response is received during the timeout period then the client-side arbitration software 590 may conclude that the present client node 570 did not win control of the first coordination point server 592, as indicated in block 707. If the first coordination point server 592 does receive the request then the first coordination point server 592 may return a response to the client-side arbitration software 590 indicating whether the present node won or lost control of the first coordination point server 592. Each time a new network partition arbitration process is started, the first coordination point server 592 may send a response to the first client node 570 from which a request is received indicating that it won control of the first coordination point server 592, and may send a response to any other client node 570 from which a request is received indicating that it lost control of the first coordination point server 592. As indicated in block 705, if the client-side arbitration software 590 on the present client node 570 receives a response from the first coordination point server 592 then the client-side arbitration software 590 may analyze the response to determine whether the present client node 570 won or lost the first coordination point server 592.

As shown in block 709, the client-side arbitration software 590 may then send a request for control of the next coordination point server 592 to the next coordination point server 592. The client-side arbitration software 590 may send the request to the next coordination point server 592 immediately upon discovering whether the first coordination point server 592 was won or lost, e.g., without any intentional delay in sending the request. The request may indicate whether the first coordination point server 592 was won or lost by the present client node 570.

In block 711, the client-side arbitration software 590 may determine whether a response to the request was received from the coordination point server 592 to which the request was sent in block 709. If not then the client-side arbitration software 590 may conclude that the present client node 570 did not win control of this coordination point server 592, as indicated in block 715. Otherwise, the client-side arbitration software 590 may determine whether the coordination point server was won or lost based on the response received, as shown in block 713.

As shown in block 717, the client-side arbitration software 590 may then determine whether there are any more coordination point servers left in the set of coordination point servers that participate in the network partition arbitration. If so, then the functionality described above may be repeated, as indicated by the flowchart arrow returning to block 709. Each time block 709 is performed, the client-side arbitration software 590 may send the next coordination point server a request indicating the win/loss results for all of the previous coordination point servers. Thus, for example, when sending a request for control to the second coordination point server, the request may indicate whether the first coordination point server was won or lost. When sending a request for control to the third coordination point server, the request may indicate whether the first coordination point server and the second coordination point server were won or lost, and so on.

For each respective next coordination point server, the client-side arbitration software 590 may immediately send the request for control to the next coordination point server once it has determined whether the previous coordination point server was won or lost, e.g., without any intentional delay in sending the request.

Once the client-side arbitration software 590 has sent a request for control to all of the coordination point servers 592, the client-side arbitration software 590 may determine whether or not the present client node 570 won control of a majority of the coordination point servers 592, as shown in block 719. If so, then the client-side arbitration software 590 may indicate to the present client node 570 that the arbitration has been resolved and the present node is allowed to remain in the cluster and continue normal operation, as shown in block 721. If the present client node 570 was acting as a representative node on behalf of other nodes in the same partition, the client-side arbitration software 590 may also notify the other nodes in the partition that they are allowed to remain in the cluster and continue normal operation.

If the client-side arbitration software 590 determines that the present client node 570 did not win control of a majority of the coordination point servers 592 then the client-side arbitration software 590 may indicate to the present client node 570 that it should exit the cluster, as indicated in block 723. If the present client node 570 was acting as a representative node on behalf of other nodes in the same partition, the client-side arbitration software 590 may also notify the other nodes in the partition that they should also exit the cluster. If the client nodes share access to a storage device 572 as illustrated in FIG. 1, any node that exits the cluster may no longer use the storage device 572 until it re-joins the cluster. The nodes that exit the cluster may subsequently re-join the cluster if their network connectivity to the other nodes in the cluster is restored. In some embodiments, after the client nodes in the partition exit from the cluster, they may re-boot themselves or attempt to perform other operations to restore their network connectivity with the other nodes in the cluster so that they can re-join the cluster.

It is noted that FIG. 4 illustrates one embodiment of the operation of the client-side arbitration software 590 executing on a given client node 570, and alternative embodiments may be used. For example, the client-side arbitration software 590 may not need to send a request for control to all of the coordination point servers 592 in order to determine that the present client node 570 has not won a majority of the coordination point servers 592. In some embodiments, as soon as the client-side arbitration software 590 determines that the present client node 570 has not won a majority of the coordination point servers 592, the client-side arbitration software 590 may inform the present client node 570 that it should exit from the cluster without first communicating with the remaining coordination point servers 592. In other embodiments the client-side arbitration software 590 may still communicate with the remaining coordination point servers 592. For example, even if the present client node has not won a majority of the coordination point servers 592, it is possible that none of the nodes participating in the arbitration process have won a majority either, e.g., due to network failures that prevent any one node from communicating with a majority of the coordination point servers. In such a situation, the client-side arbitration software 590 may utilize other techniques to decide which nodes should exit from the cluster.

In another alternative embodiment, each time the client-side arbitration software 590 sends a request for control to a coordination point server 592 that comes after the second coordination point server 592 (e.g., the third coordination point server or after), the client-side arbitration software 590 may indicate not only whether the immediately preceding coordination point server 592 was won or lost, but may also indicate whether all of the other preceding coordination point servers 592 were won or lost by the present client node 570. In some embodiments the coordination point server 592 may decide which node to award control of itself to based on these multiple outcomes (e.g., not just the outcome of the request for control of the immediately preceding coordination point server).

Figure 5:
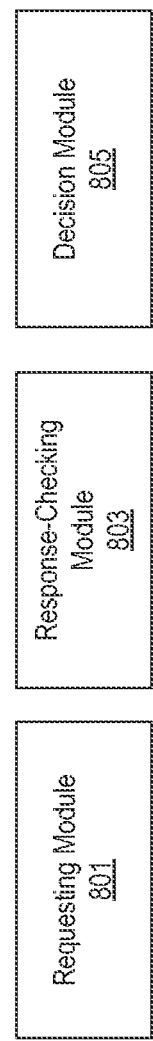
FIG. 5 illustrates various modules of the client-side arbitration software according to one embodiment.

The client-side arbitration software 590 may be implemented as one or more software programs or modules that operate to perform the functionality described above. FIG. 5 illustrates various modules of the client-side arbitration software 590 according to one embodiment. In the illustrated embodiment the client-side arbitration software 590 includes a requesting module that may perform the functionality of blocks 701 and 709 of FIG. 4. The client-side arbitration software 590 also includes a response-checking module 803 that may perform the functionality of blocks 703, 705, 707, 711, 713 and 715 of FIG. 4. The client-side arbitration software 590 also includes a decision module 805 that may perform the functionality of blocks 717, 719, 721 and 723.

Figure 6:
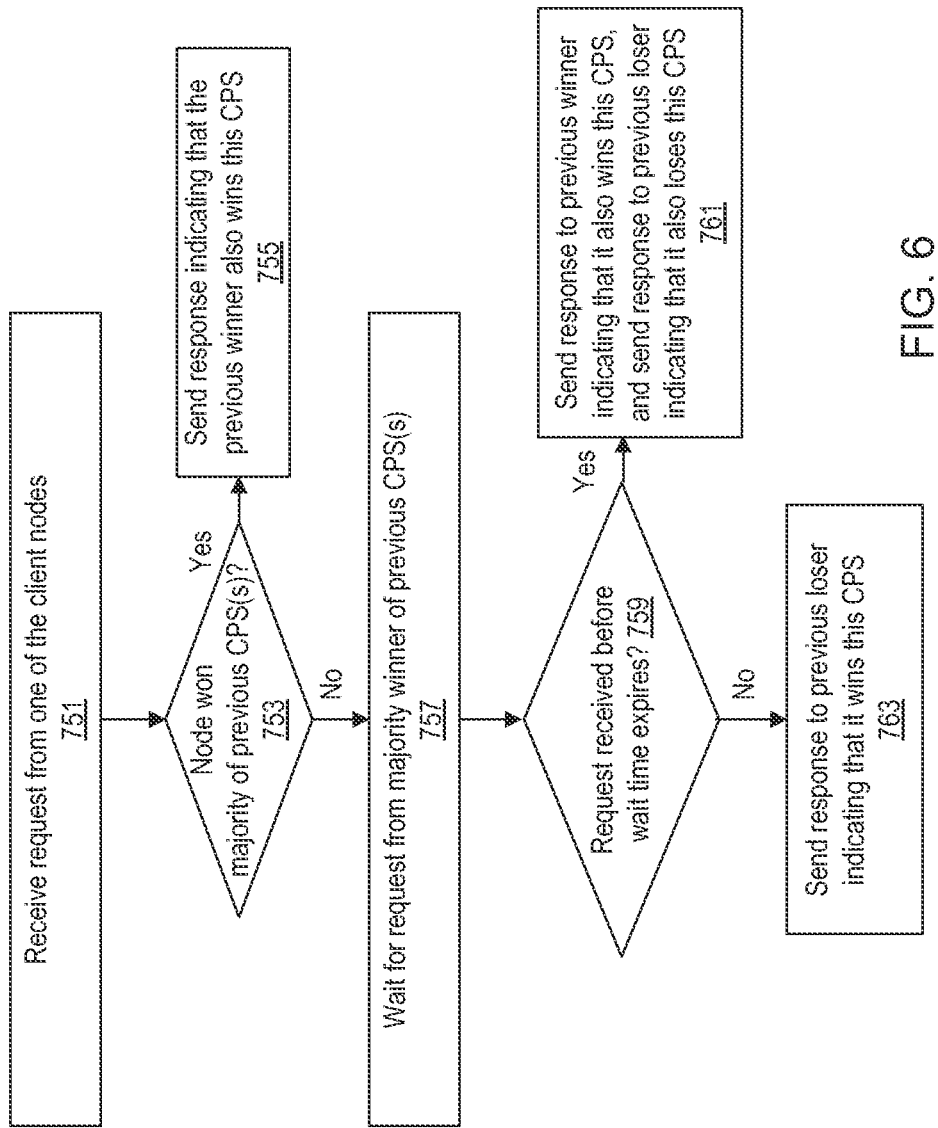
FIG. 6 is a flowchart diagram illustrating one embodiment of the operation of a coordination point server.

As described above, the first coordination point server 592 may operate to simply award control of itself to whichever node whose request is received first. Other coordination point servers 592 may give preference to a particular node that won control of one or more of the previous coordination point servers 592. FIG. 6 is a flowchart diagram illustrating one embodiment of the operation of a coordination point server 592 other than the first coordination point server 592. The coordination point server 592 may execute on one of the coordination point server computers 550.

As shown in block 751, the coordination point server 592 may receive a request for control of the present coordination point server 592 from one of the client nodes 570. In block 753, the coordination point server 592 may determine whether the client node 570 from which the request was received won control of the previous coordination point server(s) 592. In some embodiments the request sent by the client node 570 may indicate whether each of the previous coordination point servers 592 were won or lost by the client node 570, and thus the present coordination point server 592 may analyze the request to determine this information. In other embodiments the present coordination point server 592 may determine the previous win/loss information for the client node 570 in other ways, such as by querying the previous coordination point server(s) 592 for information indicating which client node 570 won control of the previous coordination point server(s) 592.

The present coordination point server 592 may decide which client node 570 to award control of itself to depending on the win/loss results on the previous coordination point servers 592, and possibly depending on when the requests are received from the various client nodes 570. As indicated in block 753, in some embodiments if the present coordination point server 592 determines that the client node 570 from which the request was received in block 751 won a majority of the previous coordination point servers 592 then the present coordination point server 592 may return a response to the client node 570 indicating that it also wins control of the present coordination point server 592, as shown in block 755. In this case, if requests for control of the present coordination point server 592 later arrive from other client nodes 570, the present coordination point server 592 may respond to these other client nodes to inform them that they did not win control of it.

If the present coordination point server 592 determines that the client node 570 from which the request was received in block 751 was not the winner of a majority of the previous coordination point servers 592 then the present coordination point server 592 may wait for a request from another client node 570 which did win a majority of the previous coordination point server 592, as shown in block 757. The coordination point server 592 may wait for up to a particular wait time, e.g., a timeout that may be configured by an administrator of the system. As indicated in blocks 759 and 761, if the coordination point server 592 receives the request for control from the client node 570 which won a majority of the previous coordination point servers 592 before the wait time expires then the coordination point server 592 may send a response to the majority winner of the previous coordination point servers 592 indicating that it has also won the present coordination point server 592. The coordination point server 592 may also send a response to the other client nodes 570 (e.g., the client node whose request was received in block 751, as well as any other non-winner client nodes from whom requests have been received in the meantime) indicating that it has also lost the present coordination point server 592.

Otherwise, if the coordination point server 592 does not receive the request for control from the client node 570 which won the majority of the previous coordination point servers 592 before the wait time expires then the coordination point server 592 may send a response to the client node whose request was received in block 751 indicating that it has won the present coordination point server 592. In this case, if the request for control of the present coordination point server 592 does later arrive from the client node 570 that won the majority of the previous coordination point server 592, the present coordination point server 592 may respond to this client node to inform it that it did not win control of the present coordination point server 592. Also, if any requests are received from client nodes that lost the previous coordination point servers, other than the client node whose request was received in block 751, the present coordination point server 592 may also respond to these client nodes to inform them that they did not win control of the present coordination point server 592.

Thus, the present coordination point server 592 may give preference to the majority winner of the previous coordination point server(s) 592 to help ensure that the same client node will also win control of the present coordination point server 592. However, the present coordination point server 592 may not wait for the request from the previous winner to arrive for more than the specified wait time so as to not unduly extend the time required to reach an arbitration decision. For example, the wait time may be set to a relatively low value that will account for normal cases of network latency.

Figure 7:
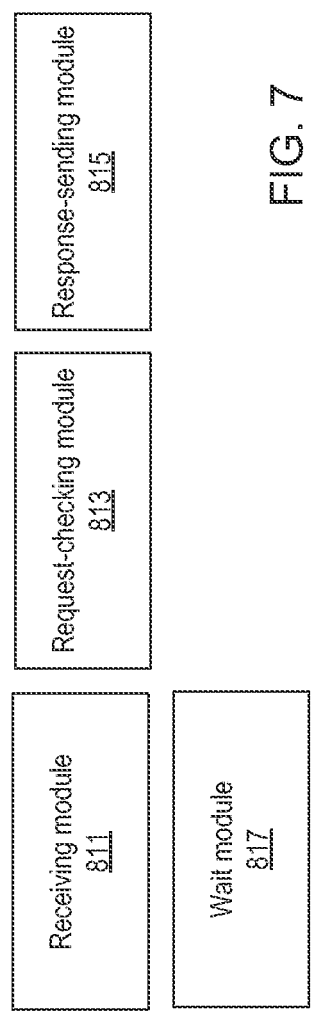
FIG. 7 illustrates various modules of the coordination point server according to one embodiment.

The coordination point server 592 may be implemented as one or more software programs or modules that operate to perform the functionality described above. FIG. 7 illustrates various modules of the coordination point server 592 according to one embodiment. In the illustrated embodiment the coordination point server 592 includes a receiving module 811 that may perform the functionality of blocks 751 and 759 of FIG. 6. The coordination point server 592 may also include a request-checking module 813 that may perform the functionality of block 753 of FIG. 6. The coordination point server 592 may also include a response-sending module 815 that may perform the functionality of blocks 755, 761 and 763 of FIG. 6. The coordination point server 592 may also include a wait module 817 that may perform the functionality of block 757 of FIG. 6.

Figure 8:
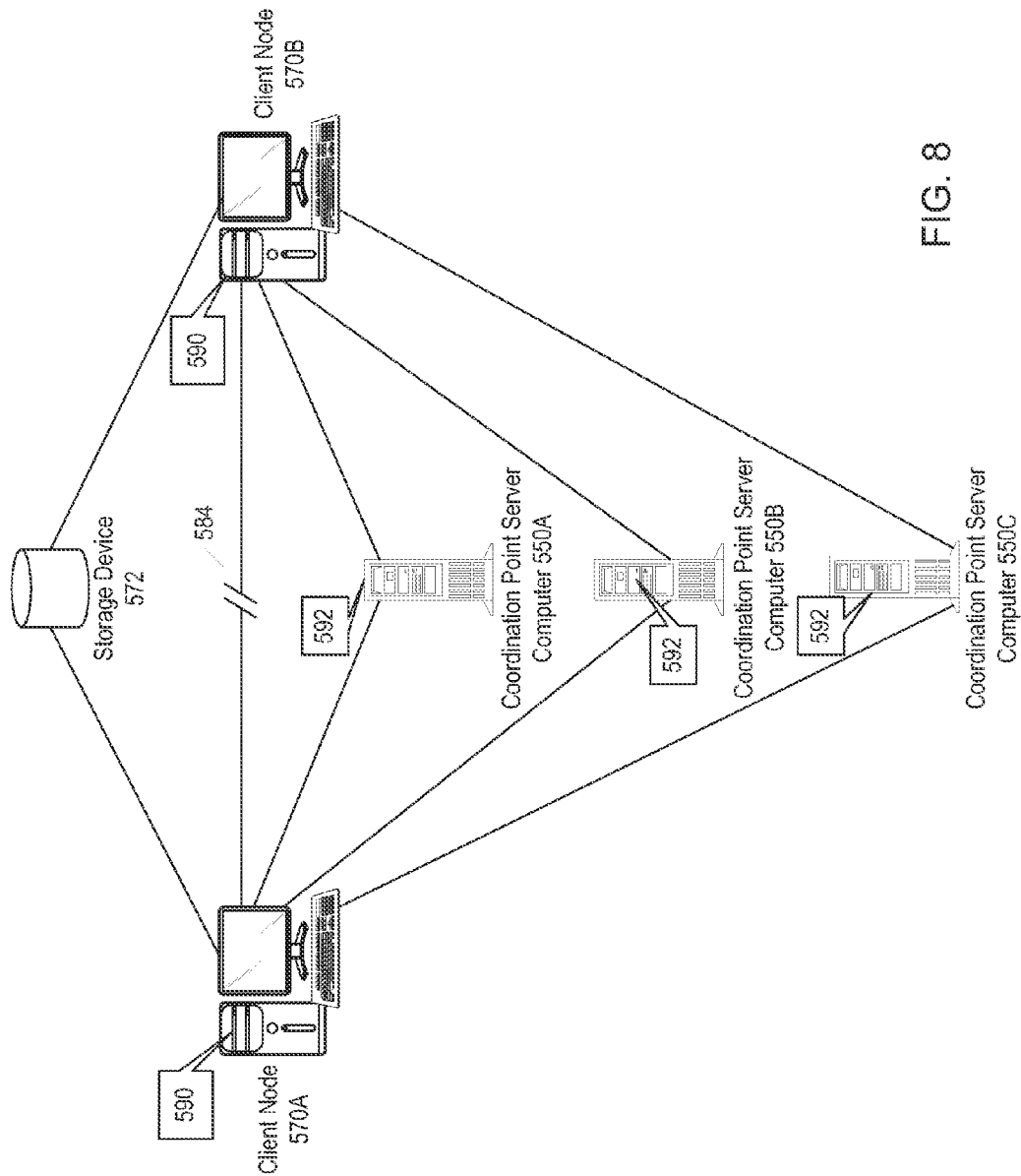
FIG. 8 illustrates an example of a system in which one client node has become partitioned from another client node.

FIG. 8 illustrates an example of a system in which a client node 570A has become partitioned from a client node 570B, as indicated by the broken network connection 584. As indicated by the other non-broken lines, both of the client nodes 570A and 570B still have working network connections with the coordination point server computers 550A, 550B and 550C, as well as to the shared storage device 572.

When the client nodes 570A and 570B discover that they cannot communicate with each other, they may begin the network partition arbitration process described herein. Suppose that the coordination point server computer 550A is first in the set of coordination point server computers, the coordination point server computer 550B is second, and the coordination point server computer 550C is third. Both of the nodes 570A and 570B may first send a request for control to the coordination point server computer 550A, and the coordination point server computer 550A may designate whichever client node whose request is received first as the winner. Suppose that the client node 570A wins control of the coordination point server computer 550A, and the client node 570B loses. The client nodes 570A and 570B may both then send a request for control to the second coordination point server computer 550B. The client node 570A may specify in its request that it was the winner of the first coordination point server computer 550A, and the client node 570B may specify in its request that it was the loser of the first coordination point server computer 550A. The second coordination point server computer 550B may use this winner/loser information to decide how to respond to the requests from the client nodes 570A and 570B. If the request from the client node 570A arrives at the second coordination point server computer 550B first then the second coordination point server computer 550B may analyze the request to determine that the client node 570A was the winner of the first coordination point server computer 550A and may immediately return a response to the client node 570A granting it control of the second coordination point server computer 550B. When the second coordination point server computer 550B subsequently receives the request for control from the other client node 570B, it may immediately return a response to the client node 570B indicating that control of the second coordination point server computer 550B was not granted.

Otherwise, if the request from the client node 570B arrives at the second coordination point server computer 550B first then the second coordination point server computer 550B may analyze the request to determine that the client node 570B was the loser of the first coordination point server computer 550A. In this case, the second coordination point server computer 550B may wait to see whether the request from the winner of the first coordination point server computer 550A arrives before the wait time expires. If so then the second coordination point server computer 550B may return a response to the previous winner (the client node 570A) granting it control of the second coordination point server computer 550B, and may return a response to the client node 570B indicating that control of the second coordination point server computer 550B was not granted. If the request from the client node 570A does not arrive before the wait time expires then the second coordination point server computer 550B may return a response to the client node 570B granting it control of the second coordination point server computer 550B. In this case, if the second coordination point server computer 550B subsequently receives the request for control from the client node 570A, it may return a response to the client node 570A indicating that control of the second coordination point server computer 550B was not granted.

In most cases it is expected that the request from the client node 570A will arrive at the second coordination point server computer 550B either before the request from the client node 570B or within the wait time period. However, in some cases it may not, e.g., if the client node 570A is unable to communicate with the second coordination point server computer 550B or if the request takes an unusually long time to arrive due to an unusually high transient network latency. If the client node 570B ends up winning control of the second coordination point server computer 550B then both of the client nodes 570A and 570B may then continue by sending a request for control to the third coordination point server computer 550C. Whichever of the nodes wins control of the third coordination point server computer 550C may be designated as the overall winner of the arbitration.

Figure 9:
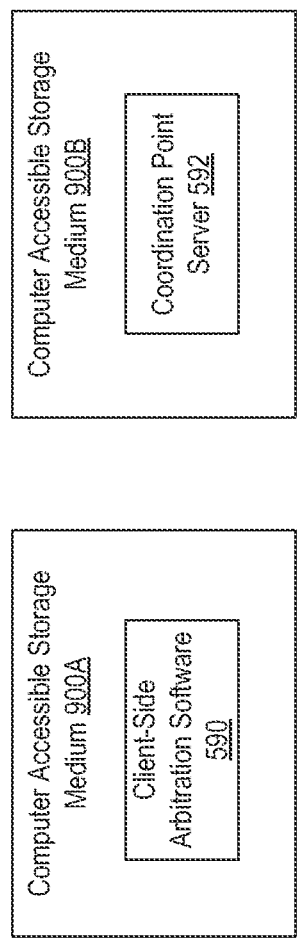
FIG. 9 is a block diagram of a computer accessible storage medium storing program instructions.

Turning now to FIG. 9, a block diagram of computer accessible storage mediums 900A and 900B is shown. The computer accessible storage mediums may store program instructions executable by one or more processors to implement various functions described above, such as program instructions for the client-side arbitration software 590 stored on the medium 900A, and program instructions for the coordination point server software 592 stored on the medium 900B. Generally, the computer accessible storage mediums 900A and/or 900B may store any set of instructions which, when executed, implement a portion or all of the functions described above that are performed by one or more client nodes 570 and/or one or more coordination point server computers 550. In some embodiments the client-side arbitration software 590 and the coordination point server software 592 may be stored on the same computer accessible storage medium.

Generally speaking, a computer accessible storage medium may include any storage media accessible by one or more computers during use to provide instructions and/or data to the computer(s). For example, a computer accessible storage medium may include storage media such as magnetic or optical media, e.g., one or more disks (fixed or removable), tapes, CD-ROMs, DVD-ROMs, CD-Rs, CD-RWs, DVD-Rs, DVD-RWs, or Blu-Ray disks. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by one or more processors to:
  receive from a first node a request for control of a particular arbitration server of a set of arbitration servers for arbitrating network partition events, wherein the set of arbitration servers is ordered according to an order;
  determine whether the first node won control of a previous arbitration server of the set of arbitration servers, wherein the previous arbitration server comes before the particular arbitration server in the order;
  if the first node did not win control of the previous arbitration server:
    wait for a request for control of the particular arbitration server from a second node that won control of the previous arbitration server;
    determine whether the request from the second node is received before a wait time expires;
    if the request from the second node is received before the wait time expires, send a response to the second node indicating that it has won the particular arbitration server and a response to the first node indicating that it has lost the particular arbitration server; and
    if the request from the second node is not received before the wait time expires, send a response to the first node indicating that it has won the particular arbitration server.

2. The non-transitory computer-accessible storage medium of claim 1, wherein the program instructions are further executable by the one or more processors to:
  if the first node won control of the previous arbitration server, send a response to the first node indicating that it has won the particular arbitration server without waiting for a request for control of the particular arbitration server from the second node.

3. The non-transitory computer-accessible storage medium of claim 1, wherein the program instructions are further executable by the one or more processors to:
  if the request from the second node is received after the wait time expires, send a response to the second node indicating that it has lost the particular arbitration server.

4. The non-transitory computer-accessible storage medium of claim 1,
  wherein the request from the first node includes information indicating whether the first node won control of the previous arbitration server; and
  wherein the program instructions are executable to analyze the request from the first node to determine whether the first node won control of the previous arbitration server.

5. The non-transitory computer-accessible storage medium of claim 1, wherein the program instructions are further executable by the one or more processors to:
  prior to receiving the request for control of the particular arbitration server from the first node, receive a request for control of the previous arbitration server from the first node and a request for control of the previous arbitration server from the second node;
  if the request for control of the previous arbitration server from the first node was received before the request for control of the previous arbitration server from the second node, send a response to the first node indicating that it has won the previous arbitration server and a response to the second node indicating that it has lost the previous arbitration server; and
  if the request for control of the previous arbitration server from the first node was received after the request for control of the previous arbitration server from the second node, send a response to the first node indicating that it has lost the previous arbitration server and a response to the second node indicating that it has won the previous arbitration server.

6. The non-transitory computer-accessible storage medium of claim 1,
  wherein the program instructions are executable by the one or more processors to cause the first node and the second node to request control of the previous arbitration server and the particular arbitration server in response to determining that the first node has become partitioned from the second node in a network.

7. The non-transitory computer-accessible storage medium of claim 1,
  wherein the first node and the second node are nodes of a network cluster;
  wherein the program instructions are further executable by the one or more processors to:
  cause the second node to remain in the network cluster in response to determining that the second node has won a majority of the arbitration servers in the set of arbitration servers; and
  cause the first node to exit the network cluster in response to determining that the first node has lost a majority of the arbitration servers in the set of arbitration servers.

8. The non-transitory computer-accessible storage medium of claim 1,
  wherein the first node and the second node are configured to use a storage device;
  wherein the program instructions are further executable by the one or more processors to:
  cause the second node to continue using the storage device in response to determining that the second node has won a majority of the arbitration servers in the set of arbitration servers; and
  cause the first node to discontinue using the storage device in response to determining that the first node has lost a majority of the arbitration servers in the set of arbitration servers.

9. The non-transitory computer-accessible storage medium of claim 1, wherein the program instructions are further executable by the one or more processors to cause the first node to:
  send a request for control of the previous arbitration server to the previous arbitration server;
  receive a response from the previous arbitration server indicating that the first node did not win control of the previous arbitration server; and
  send the request for control of the particular arbitration server to the particular arbitration server without a delay intended to delay the particular arbitration server from receiving the request.

10. The non-transitory computer-accessible storage medium of claim 1,
  wherein in sending the request for control of the particular arbitration server to the particular arbitration server, the program instructions are further executable by the one or more processors to include information in the request indicating that the first node did not win control of the previous arbitration server.

11. A method comprising:
receiving from a first node a request for control of a particular arbitration server of a set of arbitration servers for arbitrating network partition events, wherein the set of arbitration servers is ordered according to an order;
determining whether the first node won control of a previous arbitration server of the set of arbitration servers, wherein the previous arbitration server comes before the particular arbitration server in the order;
if the first node did not win control of the previous arbitration server:
 waiting for a request for control of the particular arbitration server from a second node that won control of the previous arbitration server;
 determining whether the request from the second node is received before a wait time expires;
 if the request from the second node is received before the wait time expires, sending a response to the second node indicating that it has won the particular arbitration server and a response to the first node indicating that it has lost the particular arbitration server;
 if the request from the second node is not received before the wait time expires, sending a response to the first node indicating that it has won the particular arbitration server.

12. The method of claim 11, further comprising:
if the first node won control of the previous arbitration server, sending a response to the first node indicating that it has won the particular arbitration server without waiting for a request for control of the particular arbitration server from the second node.

13. The method of claim 11, further comprising:
if the request from the second node is received after the wait time expires, sending a response to the second node indicating that it has lost the particular arbitration server.

14. The method of claim 11,
wherein the request from the first node includes information indicating whether the first node won control of the previous arbitration server;
wherein the method further comprises analyzing the request from the first node to determine whether the first node won control of the previous arbitration server.

15. The method of claim 11, further comprising:
prior to receiving the request for control of the particular arbitration server from the first node, receiving a request for control of the previous arbitration server from the first node and a request for control of the previous arbitration server from the second node;
if the request for control of the previous arbitration server from the first node was received before the request for control of the previous arbitration server from the second node, sending a response to the first node indicating that it has won the previous arbitration server and a response to the second node indicating that it has lost the previous arbitration server;
if the request for control of the previous arbitration server from the first node was received after the request for control of the previous arbitration server from the second node, sending a response to the first node indicating that it has lost the previous arbitration server and a response to the second node indicating that it has won the previous arbitration server.

16. A system comprising:
a first node;
a second node; and
a set of arbitration server computers for arbitrating network partition events, wherein the set of arbitration server computers is ordered according to an order, wherein the set of arbitration server computers includes a first arbitration server computer and a second arbitration server computer, wherein the first arbitration server computer comes before the second arbitration server computer in the order;
wherein the second arbitration server computer is configured to:
receive from the first node a request for control of the second arbitration server computer;
determine whether the first node previously won control of the first arbitration server computer;
if the first node did not win control of the first arbitration server computer:
 wait for a request for control of the second arbitration server computer from the second node, wherein the second node previously won control of the first arbitration server computer;
 determine whether the request from the second node is received before a wait time expires;
 if the request from the second node is received before the wait time expires, send a response to the second node indicating that it has won the second arbitration server computer and a response to the first node indicating that it has lost the second arbitration server computer;
 if the request from the second node is not received before the wait time expires, send a response to the first node indicating that it has won the second arbitration server computer.

17. The system of claim 16, wherein the second arbitration server computer is further configured to:
if the first node won control of the first arbitration server computer, send a response to the first node indicating that it has won the second arbitration server computer without waiting for a request for control of the second arbitration server computer from the second node.

18. The system of claim 16, wherein the second arbitration server computer is further configured to:
if the request from the second node is received after the wait time expires, send a response to the second node indicating that it has lost the second arbitration server computer.

* * * * *